United States Patent [19]

Harris

[11] 4,168,931
[45] Sep. 25, 1979

[54] FREIGHT CONTAINER TRANSPORT
[75] Inventor: William G. Harris, Warren, Mich.
[73] Assignee: The United States of America as represented by the Secretary of the Army, Washington, D.C.
[21] Appl. No.: 836,275
[22] Filed: Sep. 26, 1977
[51] Int. Cl.² ............................................. B60P 3/00
[52] U.S. Cl. ................................ 414/458; 280/43.11; 280/404; 414/352
[58] Field of Search ............... 280/43.11, 43.12, 43.15, 280/43.23, 404; 214/330, 331, 332, 390, 352

[56] References Cited

U.S. PATENT DOCUMENTS

| 1,650,031 | 11/1927 | Nash | 214/333 |
| 2,380,415 | 7/1945 | Carouthers | 214/333 |
| 3,193,301 | 6/1965 | Talbert et al. | 280/43.23 |
| 3,232,636 | 2/1966 | Buchanan et al. | 280/404 |
| 3,253,668 | 5/1966 | Tantlinger | 214/390 |

FOREIGN PATENT DOCUMENTS

| 872432 | 7/1949 | Fed. Rep. of Germany | 214/390 |
| 2154619 | 5/1973 | Fed. Rep. of Germany | 214/390 |

*Primary Examiner*—Lawrence J. Oresky
*Attorney, Agent, or Firm*—Peter A. Taucher; John E. McRae; Nathan Edelberg

[57] ABSTRACT

Freight container transport mechanism comprising a pair of jaw-like platforms movable toward one another by a winch-cable means to abut opposite ends of a freight container. As the platforms move toward one another certain upstanding struts on the platforms swing upwardly to raise the freight container from ground level to a transport position supported between the platforms.

3 Claims, 6 Drawing Figures

FREIGHT CONTAINER TRANSPORT

BACKGROUND AND SUMMARY OF THE INVENTION

This invention relates to a freight container transporter that operates somewhat in the fashion of the transporters shown in U.S. Pat. No. 3,193,301 issued on July 6, 1965 to E. H. Talbert et al. Thus each transporter includes a set of jaws that clamp against opposite ends of a freight container by winch-cable action; in each case the jaws are associated with upstanding struts that swing upwardly to lift the container from ground level as the jaws move toward one another.

My invention differs from the prior art in that the front jaw is permanently connected to a towing tractor; during a container-lifting operation the front jaw maintains a stationary position so that only the rear jaw moves. Because of the way in which the jaws are constructed and mounted it is possible to manipulate and reposition the jaws entirely with mechanical devices; no manual operations are involved, and the front jaw does not have to be disconnected from the tractor.

This invention is advantageous in that the container is neither dragged nor tilted during lifting-lowering operations, thereby minimizing potential damage to the container or its contents. The invention is further advantageous in that the lifting-lowering mechanism is self-contained within the vehicle structure, thereby eliminating the need for stationary loading facilities such as warehouse cranes. Vehicles using the invention can remain within legal height and width dimensions while still handling large containers eight feet wide, eight feet high and twenty feet long.

The invention described herein may be manufactured, used, and licensed by or for the Government for governmental purposes without payment to me of any royalty thereon.

THE DRAWINGS

Figure 1:
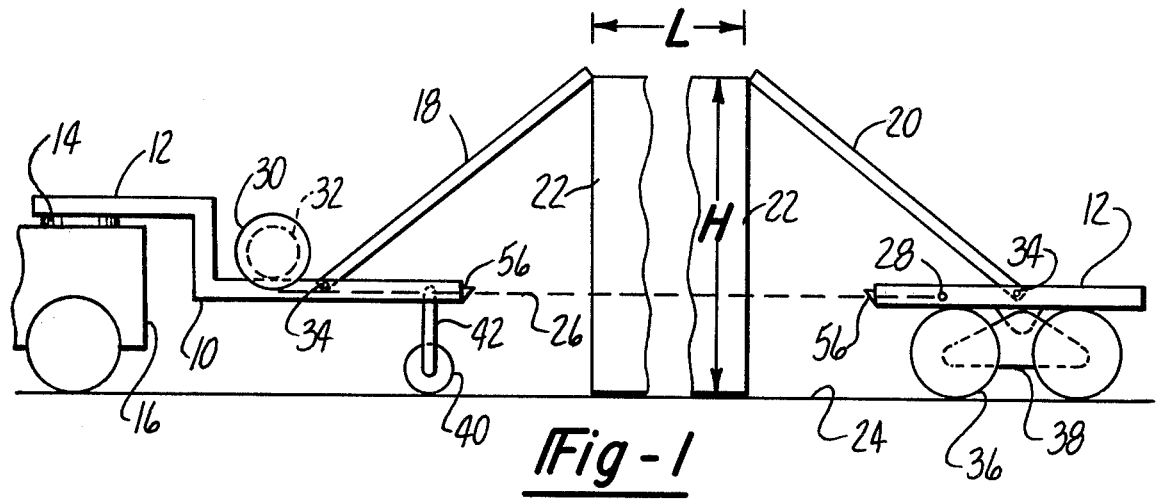
FIGS. 1 and 2 are side elevational views of a transporter incorporating my invention, with FIG. 1 showing the condition at the beginning of a container-lift operation, and FIG. 2 showing the condition after the container has been lifted into a transport position.
Figure 2:
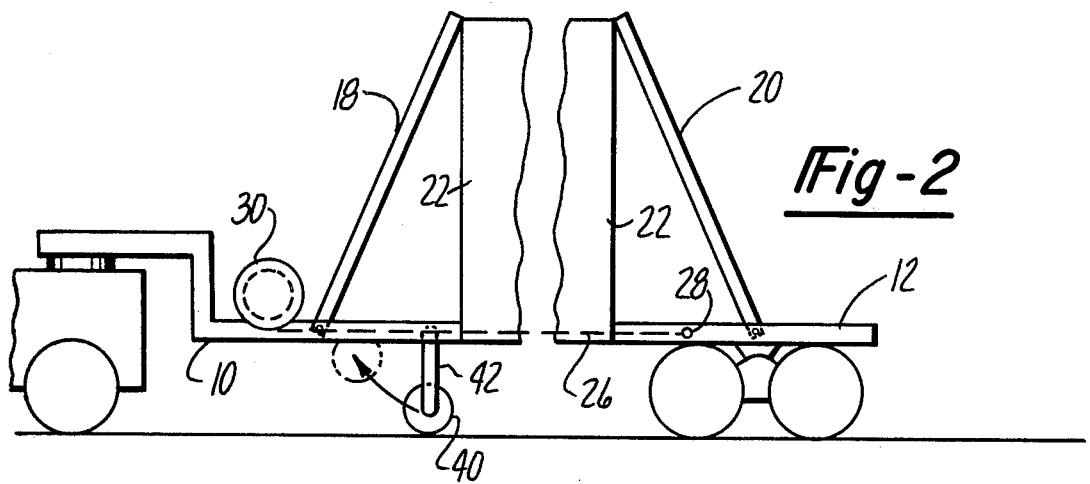
Figure 3:
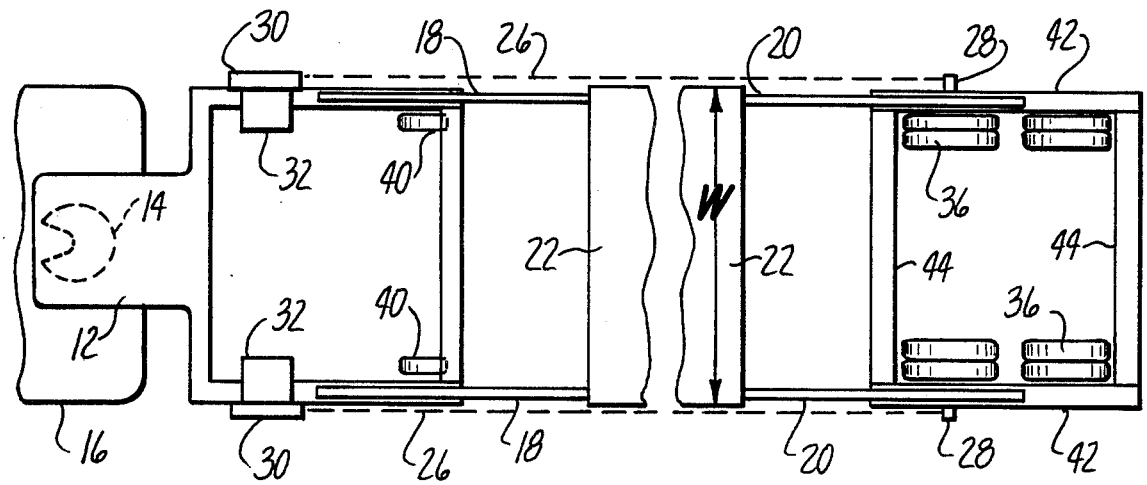
FIG. 3 is a top plan view of the FIG. 1 transporter.
Figure 5:
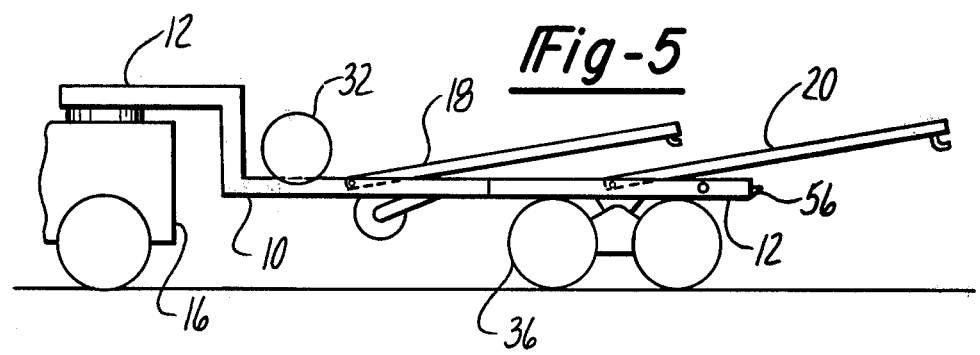
FIG. 5 is a view similar to FIG. 1 but showing certain components transposed and reconnected for tow-away operation after the freight container has been unloaded (deposited).

FIG. 1 shows one embodiment of this invention comprising a front platform or jaw 10 and a rear platform or jaw 12. Platform 10 includes a forward extension 12 that carries a depending kingpin (not visible) that engages conventional fifth wheel 14 on the rear end of a conventional tractor 16. Platforms 10 and 12 constitute a trailer that is adapted to be towed by tractor 16 in conventional fashion. FIG. 5 illustrates platforms 10 and 12 interconnected for being towed unloaded (without a freight container). FIG. 2 illustrates the platforms after a freight container has been loaded thereon for transport by the tractor 16. FIGS. 1, 2 and 3 show only the front and rear end areas of the freight container; the container is broken away to better show the transporter mechanism.

Figure 4:
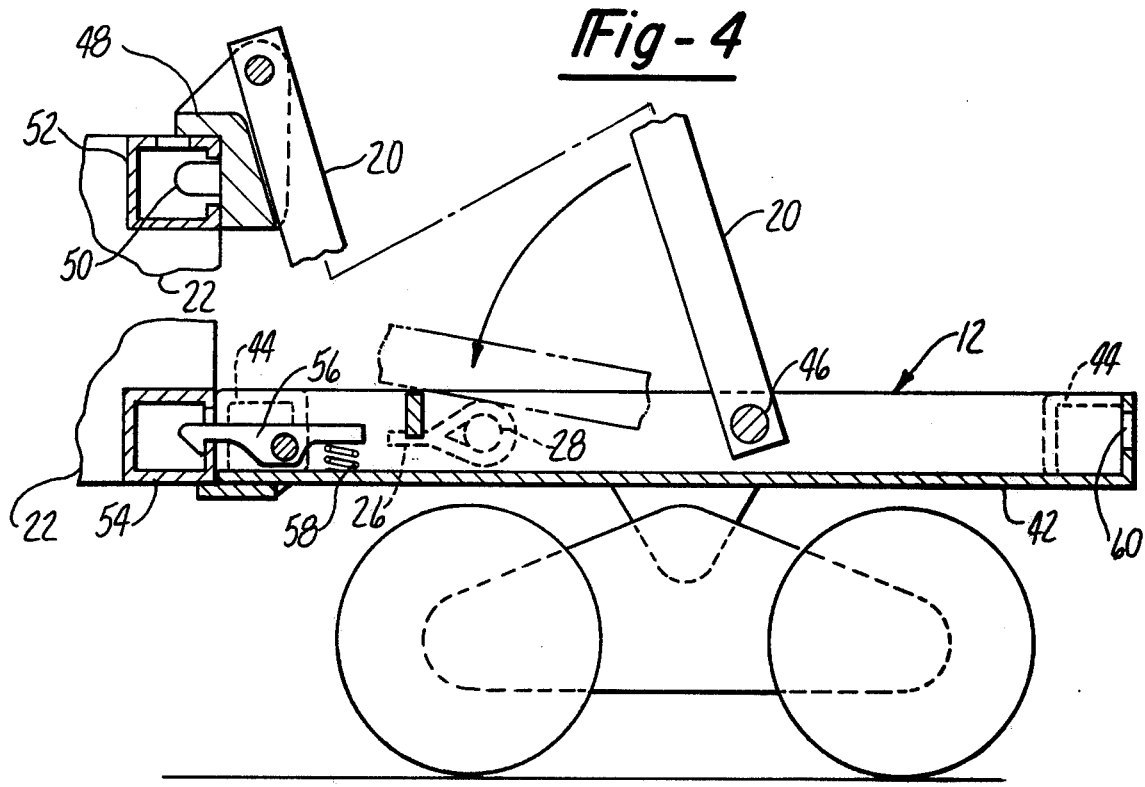
FIG. 4 is an enlarged sectional view through the rear jaw (platform) of the FIG. 1 transporter.

The invention may be utilized for transporting various size containers. However, the invention would probably find most use in transporting the standard container having a width dimension W of eight feet, a heighth dimension H of eight feet and a length dimension L of twenty feet. The standard containers have reinforced corners that are formed with small openings or slots to receive latch or connector devices of various types. The transporter mechanism of FIG. 1 would include swingable struts 18 connected to platform 10, and swingable struts 20 connected to platform 12, said struts having pins or similar devices extendable into the slots or openings in the upper corners of a standard freight container 22 to elevate the container from the FIG. 1 position resting on ground surface 24 to the elevated position shown in FIG. 2. One type of connector usable at the upper end of each strut 18 or 20 is shown in FIG. 4. Other connectors could be devised.

By comparing FIGS. 1 and 2, it will be seen that in both Figs. the platform 10 maintains a stationary position to the right of tractor 16, whereas platform 12 is moved to the left from the FIG. 1 position to the FIG. 2 position. Such leftward movement of platform 12 is achieved by the action of two cables 26 extending from anchorages 28 on platform 12 and around winding drums 30 located on platform 10. As best seen in FIG. 3, the cables 26 are located outboard from the sidewalls of the container 22 so that the straight line of action is maintained between each anchorage 28 and the associated winding drum 30. Each winding drum may be provided with its own motor 32 (electric or hydraulic). As cables 26 wind onto drums 30 the platform (or jaw) 12 is drawn toward platform 10, thereby causing the upstanding struts 18 and 20 to swing upwardly about their pivotal connections 34 with the respective platforms. As the struts swing upwardly they lift the container 22 from its FIG. 1 ground-level position to its FIG. 2 transport position. The struts 18 and 20 are dimensioned so that when the bottom surface of container 22 reaches the level of platforms 10 and 12 the edge areas of the platforms will abut against the lower corner areas of the freight container. Each platform 10 and 12 preferably includes latch means that engages keeper openings in the reinforced corners of the freight container to minimize tendency for the platforms to separate or spread apart; with some container loadings the latches might not be necessary, since the cables 26 would act as retention devices.

The rear platform 12 is supported in a level attitude above the ground surface 24 by means of conventional wheels 36 mounted on walking beams 38. The front platform 10 is supported in a level attitude by means of small ground wheels 40 carried by landing legs 42. When it is desired to tow the freight container overland to a new location the landing legs 42 are retracted or swung upwardly as indicated by the arcuate arrow in FIG. 2. The load comprised of container 22 and the two support platforms, is then supported on the rear wheels 36 and the wheels of tractor 16; retractible wheels 40 are utilized only during the container lift or container lower operations (between FIG. 1 and FIG. 2 conditions).

Each platform 10 or 12 can be constructed in various ways. As shown in FIG. 4, platform 12 is formed as a rectangular frame structure that includes two side channels 42 and two tubular rectangular cross section end members 44. Each of two struts 20 has its lower end extending into one of the channels 42 for pivotal connection to the platform, as by means of a pin 46. The upper end of each strut 20 is pivotally connected to a pendulum-like bracket 48 having a pin-like extension 50 for entry into an opening in the reinforced corner 52 of the freight container 22.

When the struts 20 (and 18) have swung upwardly to elevate the freight container to the FIG. 4 position the end surface of the container will abut the edge of platform 12 defined by tube 44. At the same time the lower reinforced corner 54 will interengage with the latch 56 that is pivotally mounted in the channel 42. A coil spring 58 provides a biasing force that snaps the latch into an engaged position after the leading end of the latch has entered through the keeper opening in corner 54. The latch may be retracted by downward manual force on latch surface 58, e.g. during a container lower operation.

FIG. 4 illustrates one possible construction for jaw platform 12. Jaw platform 10 is constructed in a similar fashion except that it is provided with extension 12 for connection with the tractor 16. The principle characteristics required for jaws 10 and 12 are that each jaw constitutes a level platform or base for the swingable struts 18 or 20. Each jaw should be continuously supported in its level attitude, as by means of ground wheels 36 and 40, while the winding drum 30 is being rotated to draw the cable 26 in a leftward direction. The line of action of each cable 26 is preferably horizontal and within the horizontal plane defined by platforms 10 and 12 so that each cable runs straight without small radius turns or bends as might stress or fatigue the cable.

After a freight container is deposited at its destination (ground level) the platforms 10 and 12 may be separated from the container by first disconnecting cables 26 from anchorages 28 and then disengaging the various latches 56 from the lower corners of the container. Tractor 16 may be driven forwardly to draw platform 10 away from the freight container. Platform 12 may be removed from the container by backing the tractor in a circular arc so that the rear end of platform 10 abuts the free (rear) end of platform 12. As platform 10 abuts platform 12 the latches 56 in platform 10 interengage with keeper openings 60 in the ends of the platform 12 channels (FIG. 4), thereby latching the two platforms together in the tow-away mode illustrated in FIG. 5. The various struts 18 and 20 will assume substantially prone conditions, as shown in FIGS. 4 and 5; a stop 62 (FIG. 4) may be located in each channel 42 to limit downward motion of each strut 18 or 20.

Figure 6:
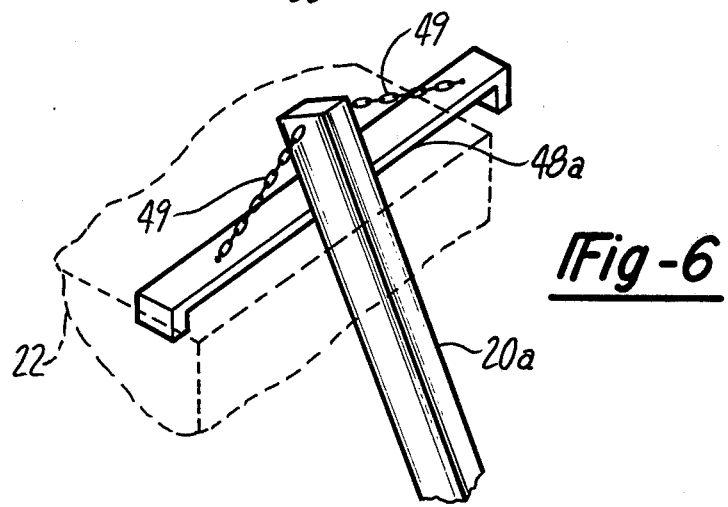
FIG. 6 is a perspective view of a spreader bar device that can be used in practice of the invention.

It will be understood that the strut construction may be changed or varied, as deemed most appropriate. For example, as shown in FIG. 6 the two parallel struts 20 may be replaced by a single centrally-located strut 20a suitably attached to a conventional spreader bar 48a by means of chains 49. Pins in the ends of the spreader bar will enter into openings in the upper corners of freight container 22 to operatively connect strut 20 to the container. A similar strut-spreader bar assembly could be substituted for spaced parallel struts 18.

I wish it to be understood that I do not desire to be limited to the exact details of construction shown and described for obvious modifications will occur to a person skilled in the art.

I claim:

1. Freight container transport mechanism comprising a tractor (16); a front platform (10) connected to the rear end of the tractor for engagement with one end of a rectangular freight container; a rear platform (12) spaced behind the front platform for engagement with the other end of the freight container; each platform having ground-engagement wheels which maintain the respective platform in a level attitude above the ground surface; first non-extensible upstanding strut means (18) swingably connected to the front platform for movement in a vertical plane parallel to the longitudinal centerline of the transport mechanism, said first strut means having end bracket means (48) adapted to supportably engage an upper front corner of the freight container; second non-extensible upstanding strut means (20) swingably connected to the rear platform for movement in a vertical plane parallel to the longitudinal centerline of the transport mechanism, said second strut means having end bracket means (48) adapted to supportably engage an upper rear corner of the freight container; winch-cable means for drawing the rear platform toward the front platform so that the upstanding strut means are caused to swing upwardly about their connections with the respective platforms, thus lifting the freight container from ground level and eventually allowing the platforms to abut against lower corner areas of the container; first latch means (56) carried by the front platform for locking engagement with lower front corner areas of the freight container when the front platform abuts the container; and second latch means (56) carried by the rear platform for locking engagement with lower rear corner areas of the freight container when the rear platform abuts the container; the winch-cable means comprising two laterally-spaced winding drums (30) located at side edges of the front platform and a separate cable (26) wound from each drum to an anchorage (28) on the rear platform.

2. The transport mechanism of claim 1 wherein the winding drums and cable anchorages are located so that during reel-in operations the cables exert horizontal forces in the planes of the two platforms; the taut section of each cable being linear without turns or bends.

3. The transport mechanism of claim 1 wherein each latch means (56) is a spring-urged latch having a leading end that automatically snaps into locking engagement with keeper surfaces at lower corners of the container.

* * * * *